United States Patent [19]

Hala

[11] 4,073,329
[45] Feb. 14, 1978

[54] WEDGE SHAPED LOCK WASHER CONSTRUCTION AND ASSEMBLY

[75] Inventor: Alfred A. Hala, Islip, N.Y.

[73] Assignee: Hohmann & Barnard, Inc., Hauppauge, N.Y.

[21] Appl. No.: 740,383

[22] Filed: Nov. 10, 1976

[51] Int. Cl.² ............................................. F16B 39/24
[52] U.S. Cl. ...................................... 151/20; 85/50 C
[58] Field of Search ............... 151/20, 21 C; 85/50 R, 85/50 C, 8.6, 8.9, 7; 403/408, 405; 254/104; 52/584

[56] References Cited

U.S. PATENT DOCUMENTS

| | | | |
|---|---|---|---|
| 147,187 | 2/1874 | Spacht | 85/8.9 |
| 168,021 | 9/1875 | Holton | 151/20 |
| 878,143 | 2/1908 | Koch | 85/8.9 X |
| 1,322,246 | 11/1919 | Krekow | 85/8.9 |
| 1,348,339 | 8/1920 | Warren | 85/8.9 X |
| 1,854,277 | 4/1932 | Schatz | 151/20 X |
| 3,323,842 | 6/1967 | Hanson | 85/50 C |
| 3,438,300 | 4/1969 | Blom et al. | 85/50 C |

*Primary Examiner*—Ramon S. Britts
*Attorney, Agent, or Firm*—Philip D. Amins

[57] ABSTRACT

A washer and fastening system for adjustably positioning and rigidly locking a first member relative to a second member, with one of the members having an aperture therein for receiving a fastener adapted to extend through the washer, with the members being provided with planar surfaces of engagement permitting adjustment relative to each other along a common plane and being normally subjected to external forces tending to shift them relative to each other in one direction. The washer includes a body element having an elongated slot for the fastener with oppositely disposed ends and spaced apart surfaces intermediate the ends, with the surfaces inclined relative to each other, such that one of the surfaces is adapted to engage one of the members in abutting relationship thereto and the other surface is inclined relative thereto, and means for permitting removable positional securement of the body element relative to the aperture in one of the members is provided. The inclined surfaces of the body element are brought into wedging engagement between the member and an enlarged outer end of the fastener as the external forces are applied in order to positively lock the members together.

73 Claims, 17 Drawing Figures

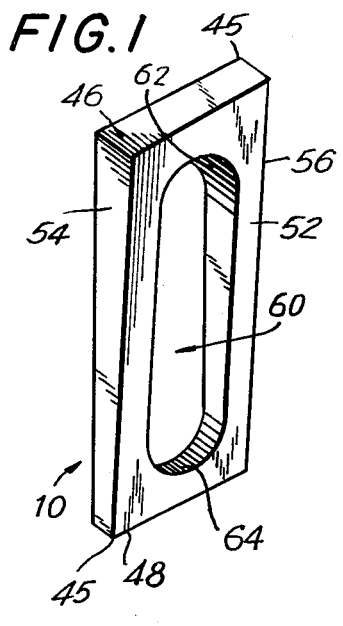
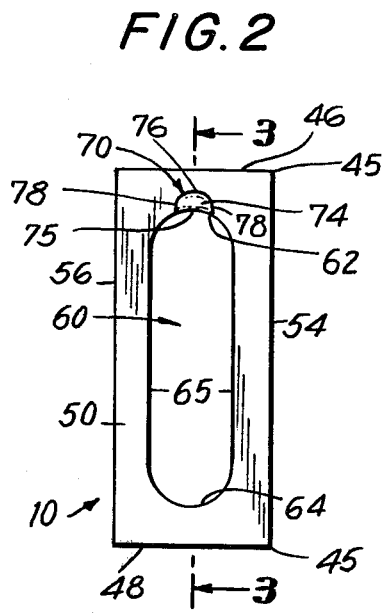
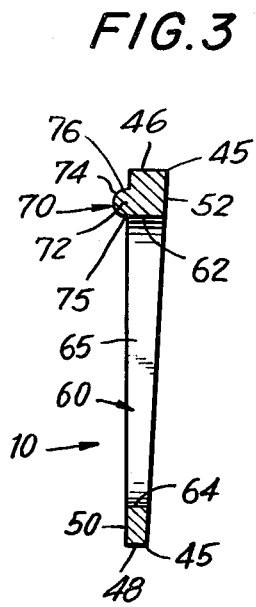
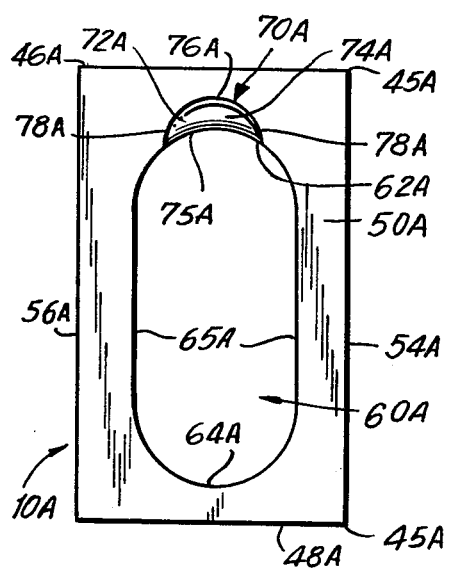
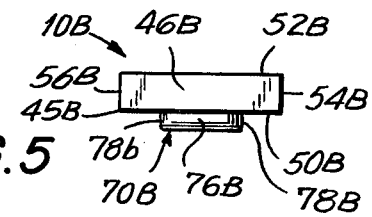
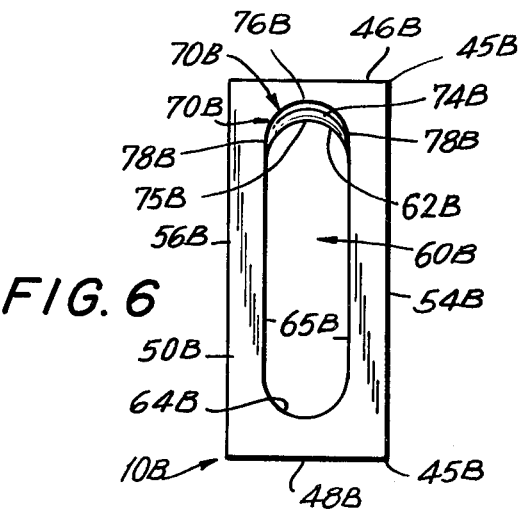

WEDGE SHAPED LOCK WASHER CONSTRUCTION AND ASSEMBLY

BACKGROUND OF THE INVENTION

The present invention relates to fastening devices for rigidly coupling one member in an adjusted position relative to another member, and more particularly to a washer for use in the fastening device.

The construction of various structures depends upon the utilization of fastening systems that are designed to rigidly couple the respective members together as various loads are applied thereto. The respective members may take various shapes and forms well known in the construction industry. For example, one member may itself be a brick wall or other masonry which is to have secured thereto a steel framework. Due to the inherent tolerances in the manufacture of steel framing, as well as in masonry construction, and due to other deflections that can occur during construction, there exists a need for a fastening system that permits the respective members to be rigidly coupled and locked in place relative to each other.

OBJECTS OF THE INVENTION

An object of the present invention is to provide a new and novel washer that is utilized in conjunction with a fastening system for rigidly locking respective members together.

It is another object of the present invention to provide a washer having inclined surfaces adapted to abut one of the members of the fastening system in order to withstand the forces applied thereto.

It is yet a further object of the present invention to provide a fastening system utilizing a washer having inclined surfaces which permit bearing loads to be applied to the members that the fastening system retains in fixed relationship to each other.

It is yet a further object of the present invention to provide a fastening system having a washer in which there is provided adjustability in the initial positioning of the aforesaid members which are to be rigidly locked together.

SUMMARY OF THE INVENTION

A washer and fastening system for rigidly locking a first member relative to a second member, with one of the members having an aperture therein for receiving a fastener adapted to extend through the washer, and having an enlarged outer end. The members are provided with planar surfaces of engagement permitting adjustment relative to each other along a common plane and being normally subjected to external forces tending to shift them relative to each other in one direction.

The washer includes a body element having oppositely deposed ends and spaced apart surfaces intermediate the ends. The surfaces are inclined relative to each other in the direction of one of the ends, and one of the surfaces is adapted to engage one of the members in abutting relationship thereto. Means for permitting removable positional securement of the body element relative to the aperture in one of the members is provided.

An elongated slot extending vertically in the body element between the ends and through the surfaces is provided. The slot is positionable in alignment with the aperture for receiving therethrough the fastener with the enlarged outer end thereof extending beyond the surfaces, for securing the members and washer together. The inclined surfaces of the body element are brought into wedging engagement between the member and the enlarged outer end as the external forces are applied in order to positively lock the members together.

BRIEF DESCRIPTION OF THE DRAWINGS

The foregoing and other objects, features, advantages and utilizations of the new and novel washer and fastening system of the present invention will become more apparent from the detailed description hereinafter considered in conjunction with the accompanying drawings, wherein:

FIG. 1 is a perspective view of the washer of the present invention;

FIG. 2 is a front view of the washer as illustrated in FIG. 1;

FIG. 3 is a sectional view taken on the line 3—3 of FIG. 2;

FIG. 4 is a front view of another embodiment of a washer of the present invention;

FIG. 5 is a top view of another embodiment of a washer of the present invention;

FIG. 6 is a front view of the washer illustrated in FIG. 5;

DETAILED DESCRIPTION OF THE PREFERRED EMBODIMENTS

Figure 9:
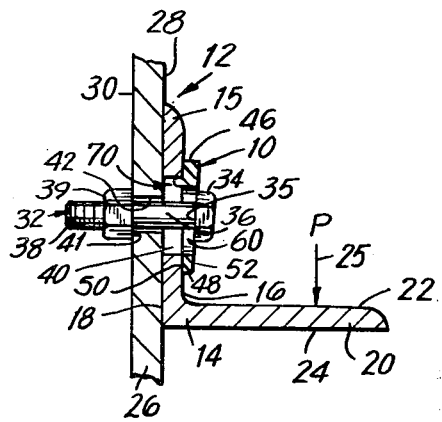
FIG. 9 is a sectional view of a fastening system in accordance with the present invention.

Referring now to the drawings, and more particularly to FIGS. 1 through 3 thereof, there is shown a first embodiment of a washer 10 constructed in accordance with the principles of the present invention and utilized in conjunction with certain fastening systems illustrated in FIGS. 9 through 13 that are not intended to be all inclusive. Certain additional embodiments of the washer are illustrated in FIGS. 4 through 8, and are adaptable to be used in fastening systems as illustrated in FIGS. 9 through 13.

The washer 10 of FIGS. 1 through 3, as hereinafter discussed with the fastening system 12 illustrated in FIG. 9, may include a first or outer structural member 14 that may take various forms, for example that of a horizontal shelf angle commonly used in the construction industry. The first member 14 may include a vertical flange 15 having a planar outer or front surface 16 and an inner or rear surface 18 spaced from each other. A horizontal flange 20 extends at a substantially right angle to the vertical flange 15 and includes an upper or load bearing surface 22 and an under surface 24. The load bearing surface 22 is usually subjected to external forces or pressure "P" of various magnitude indicated by the single headed arrow 25.

A second member 26 having a planar inner surface 28 and outer surface 30 forms part of the structural fastening system 12. The planar surfaces 18 and 28 of the members 14 and 26 are adapted for engagement in overlapping abutting relationship with each other permitting adjustment relative to each other along the common plane of the surfaces 18 and 28 and tending to shift relative to each other when the external forces as indicated by arrow 25 are applied.

The washer 10 functions in conjunction with a fastener 32, which may take various forms and shapes, but is intended to bolt together the members 14 and 26. As illustrated in FIG. 9 the fastener 32 is in the form of a bolt including an enlarged outer end 34 which may be a hexagonal head having an abutting or contacting face or surface 35 normally extending in a plane substantially normal to the axis of the shaft 36 with a threaded terminal end 38 for receiving a nut 39 having an underside or bottom face 41 thereon. The member 14 includes an aperture 40 extending therethrough, and the second member 26 an opening or clearance hole 42 extending therethrough for receiving the shaft 36.

If a conventional washer or lockwasher was used with the above described fastening system 12, then the applied forces would cause a downward or lateral movement of the first member 14 tending to shift the latter relative to the second member 26. Obviously this condition cannot be tolerated and the present invention provides a new and novel washer 10 which is utilized in conjunction with and as part of the above described fastening system 12 described in FIG. 9, or alternates thereof as hereinafter described with respect to FIGS. 10 through 13 to provide the same advantages.

Referring now particularly to FIGS. 1 through 3 the washer 10 includes a body element 45 having oppositely disposed or spaced apart first or enlarged top end 46 and second or bottom end 48. The bottom end 48 as hereinafter explained is of smaller rectangular dimension than the top end 46 to provide a wedge shaped configuration to the washer 10. The body element 45 further includes a spaced apart front surface or face 50 and rear surface or face 52 inclined relative to each other in the direction of one of the respective ends 46 or 48. As illustrated the tapered bearing surfaces 50 and 52 extend outwardly from the bottom end 48 towards the top end 46 by a preselected angle of inclination selected to provide the necessary wedging affect to provide the necessary restraint to maintain the members 14 and 26 in fixed position to each other when the nut 39 is tightened relative to the fastener 32. The body element 45 further includes a pair of sides or walls 54 and 56 that may extend in parallel spaced apart relationship to each other and in a plane normal to the ends 46 and 48.

An elongated groove or slot 60 extends vertically in the body element 45 between the ends 46 and 48 and through the surfaces 50 and 52. The slot 60 is positioned in alignment with the aperture 40 for receiving therethrough the shaft 36 of fastener 32 with the enlarged bolt head 34 at the outer end thereof extending beyond the rear surface 52 for securing the members 14 and 26 and washer 10 together. The slot 60 includes a pair of spaced apart ends or terminal edges 62 and 64 adjacent the top end 46 and bottom end 48 respectively. A pair of longitudinal side edges 65 define the width of the slot 60 and may extend in a plane substantially parallel to the respective side walls 54 and 56, and join the terminal edges 62 and 64 together.

The washer 10 further includes locating means 70 for permitting removable positional securement of the body element 45 relative to the aperture 40 in the first member 14. The aperture 40 may be of varied configuration and may conform to the shape of the slot 60. The locating means 70 includes a protrusion or lug 72 that may be positioned adjacent the upper end 46 and having a forward tip or distal end 74 extending beyond the front surface 50 and adapted to be received in the aperture 40 at one end thereof. The protrusion 72 has an inner edge 75 that may coincide with the terminal edge 62 and also has an outer edge 76 which abuts or engages the wall of the aperture 40 and is contoured accordingly. The protrusion 72 has side faces 78 that may define the outer margin of the protrusion 72. The side faces 78 may be of narrower width than the slot 60.

The washer 10 when in assembled relationship as illustrated in FIG. 9 utilizes the inclined surfaces 50 and 52 of the body element 45 to be brought into wedging engagement between the first member 14 and the fastener head 34 as the external forces, P, are applied in order to positively lock the members 14 and 26 together. By providing the protrusion 70 adjacent the diverging or enlarged end 46, the body element 45 has the front surface 50 brought into intimate abutting engagement with the surface 16 of the first member; and serves to maintain the washer 10 in fixed position with respect to the first member 14. The angle of inclination is selected in conjunction with the tensile strength of the fastener 32 such that the underside 35 or the bolt head 34 is permitted to bend the shaft 36 under the load of the applied forces, P, to conform to the angle defined by the rear surface 52. Stated alternatively, the angle of inclination is selected to provide the most efficient wedging action and yet be compatible with the allowable bending deformation of the bolt.

This angular relationship defined between surfaces 50 and 52 provides the interlocking wedging engagement to maintain the members 14 and 26 in their clamping locking position and to fixedly position the washer 10 relative thereto. As seen in FIG. 9 the bolt head 34 will tilt or bend relative to the axis of shaft 36 when the first member 14 comes to rest against the washer 10. Accordingly, depending upon the loads to be applied, the bolt diameter, the angle defined by the surface 50 and 52, as well as the material from which they are to be fabricated, may be preselectively determined.

With reference to FIG. 4, there is illustrated a second embodiment of the present invention depicting a washer 10A, and, wherein similar parts are denoted by similar reference numerals. The washer 10A may be utilized in conjunction with the fastening system illustrated in FIG. 10.

Figure 10:
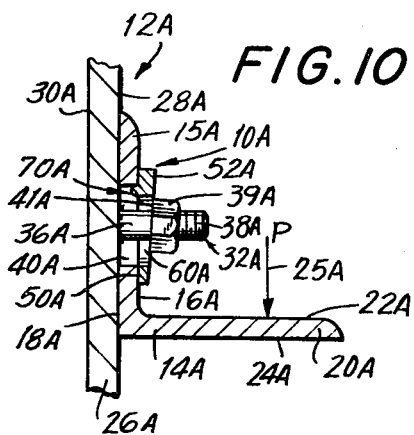
FIG. 10 is a sectional view of another embodiment of a fastening system in accordance with the present invention.
Figure 11:
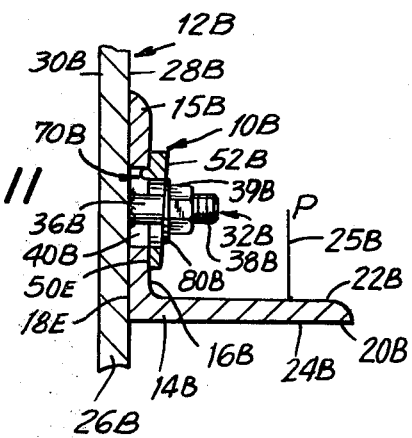
FIG. 11 is a sectional view of yet another embodiment of a fastening system in accordance with the present invention.

The fastening system 12A illustrated in FIG. 10 includes a first member 14A having a vertical flange 15A with a planar front surface 16A and an inner or rear surface 10A disposed in spaced apart relationship. A horizontal flange 20A extends at substantially right angle to the vertical flange 15A and includes an upper or load bearing surface 22A and an under surface 24A. The load bearing surface 22 is usually subjected to external forces or pressure "P," of various magnitude, and is indicated by the single headed arrow 25A.

A second member 26A having a planar inner surface 28A and interior surface 30A forms part of the structural fastening system 12A. The planar surfaces 18A and 28A of the members 14A and 26A are adapted for engagement with each other permitting adjustment relative to each other along the common plane of the surfaces 18A and 28A.

The washer 10A functions in conjunction with fastener 32A which in this embodiment includes a shaft 36A welded to the inner surface 28A with a threaded terminal end 38A for receiving a nut 39A having an underside 41A thereon. The member 20A includes an aperture 40A for receiving the shaft 36A therethrough. The underside 41A of nut 39A when tightened conforms to the inclined angle defined by surface 52A of washer 10A.

Referring now particularly to FIG. 4 the washer 10A includes a body element 45A having oppositely disposed or spaced apart first or enlarged top end 46A and second or bottom end 48A. The body element 45A further includes a spaced apart front surface or face 52A inclined relative to each other in the direction of one of the respective ends 46A or 48A. As illustrated in FIG. 10 the tapered surfaces 50A and 52A extend outwardly from the bottom end 48A towards the top end 46A by a preselected angle of inclination selected to provide the necessary wedging affect to provide the necessary restraint to maintain the members 14A and 26A in fixed position to each other when the nut 39A is tightened relative to the washer 10A. The body element 45A further includes a pair of sides or walls 54A and 56A that may extend in parallel spaced apart relationship to each other and in a plane normal to the ends 46A and 48A.

An elongated groove or slot 60A extends vertically in the body element 45A between the ends 46A and 48A and through the surfaces 50A and 52A. The slot 60A is positioned in alignment with the aperture 40A for receiving therethrough the shaft 36A of fastener 32. The slot 60A includes a pair of spaced apart terminal edges 62A and 64A adjacent the top end 46A and bottom end 48A, respectively. A pair of longitudinal side edges 65A define the width of the slot and extend in a plane substantially parallel to the respective side walls 54A and 56A, and join the end edges 62A and 64A together.

The washer 10A further includes locating means 70A for permitting removable positional securement of the body element 45A relative to the aperture 40A in the first member 14A. The locating means 70A includes a protrusion or lug 72A positioned adjacent the upper end 46A and having a forward tip or distal end 74A extending beyond the front surface 50A and adapted to be received in the aperture 50A at one end thereof. The protrusion 72A has an inner edge 75A that may coincide with the terminal edge 62A and includes an outer edge 76A which abuts or engages the wall of the aperture 40A and contoured accordingly. The protrusion 72A has side faces 78A that define the outer margin of the protrusion 72A. In this embodiment as illustrated in FIG. 4 the side faces are wider or spaced further apart than the respective side faces of the embodiment illustrated in FIG. 1 through 3.

With reference to FIGS. 5 and 6, there is illustrated a third embodiment of the present invention depicting a washer 10B, and wherein similar parts are denoted by similar reference numerals. The washer 10B of FIGS. 5 and 6 may be utilized in conjunction with the fastening system 12B illustrated in FIG. 11. The fastening system 12B is substantially identical to that illustrated with respect to FIG. 10, except that a conventional beveled washer 80B is interposed between the inclined surface 52B and the underside 41B of the nut 39B in this manner the nut 39B remains in alignment with the shaft 36B of the fastener 32B. The washer 10B is substantially identical to the embodiments illustrated in FIGS. 1 through 4 except that the width of the locating means 70B is substantially equal to the width of the slot 60B. In certain applications it has been found desirable to conform the slot 60B with that of the aperture 40B. In this situation, the locating means 70B includes the protrusion 72B positioned adjacent the upper end 46B and has a forward tip or distal end 74B which extends beyond the front surface 50B and is adapted to be received in the aperture 40B at one end thereof. The protrusion 72B has an inner edge 75B that may coincide and conform with the terminal edge 62B for the complete width thereof between the side edges 65B. The outer edge 76B abuts or engages the wall of the aperture 40B and may be conformaly contoured. The protrusion 72B has side faces 78B which in this embodiment of the invention define the outer margin of the protrusion 72B and are the same width as the side edges 65B of slot 60B. In the present embodiment, there is very little possibility of the aperture 40B and slot 60B being moved away from the conformed aligned relationship herein desired. This is due to the additional strength of securement provided by the enlarged cross sectional area of the protrusion 72B.

Figure 12:
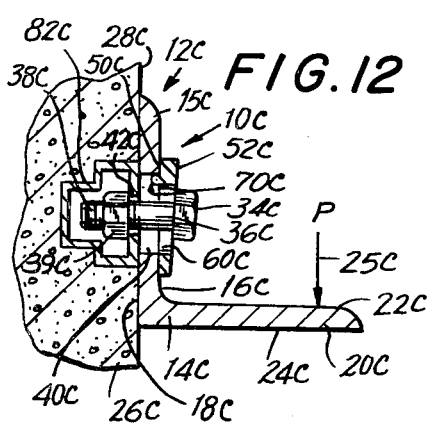
FIG. 12 is a sectional view depicting yet a further embodiment of a fastening system used with masonry in accordance with the present invention.

With reference to FIG. 12, there is illustrated an alternate fastening system 12C of the present invention, and wherein similar parts are denoted by similar reference numerals. The fastening system 12C includes a first structural member 14C that may be in the form of a horizontal shelf angle commonly used in the construction industry. The first member 14C may include a vertical flange 15C having a planar outer surface 16C and an inner or rear surface 18C spaced from each other. A horizontal flange 20C extends at a substantially right angle to the vertical flange 15C and includes an upper or load bearing surface 22C and an under surface 24C. The load bearing surface 22C is usually subjected to external forces or pressure "P" of various magnitude indicated by the single headed arrow 25C.

The second member 26C, in this embodiment, may be in the form of a concrete wall or beam having a planar inner surface 28C. The planar surfaces 18C and 28C of the members 14C and 26C are adapted for engagement with each other permitting adjustment relative to each other along the common plane of the surfaces 18C and 28C and tending to shift relative to each other when the external forces as indicated by arrow 25C are applied. A retaining member or element 82C IS embedded within the concrete second member 26C having a cavity therein for receiving the nut 39C and includes a flange 84C which is in alignment with the surface 28C. The shaft 36C extends through the aperture 40C, and opening 42C in the retaining member 82C, with the washer 10C mounted relative thereto.

Figure 13:
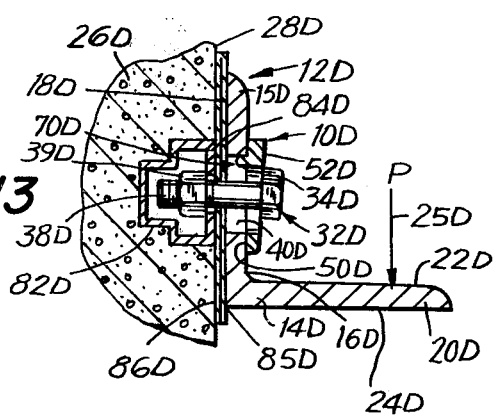
FIG. 13 is a sectional view of another embodiment of a fastening system in which shim material is utilized.

With reference to FIG. 13 there is illustrated an alternate fastening system 12D of the present invention, and wherein similar parts are denoted by similar reference numerals. The embodiment of FIG. 13 is similar to that illustrated in FIG. 12 but includes a washer 10D mounted relative to the first member 14D with shim material or sheets 85D and 86D interposed between the surfaces 18D and 28D to permit the desired lateral adjustment therebetween. In this manner the desired adjustment of the first member 14D relative to the second member 26D is first obtained before the fastener 32D is bolted in place.

Figure 7:
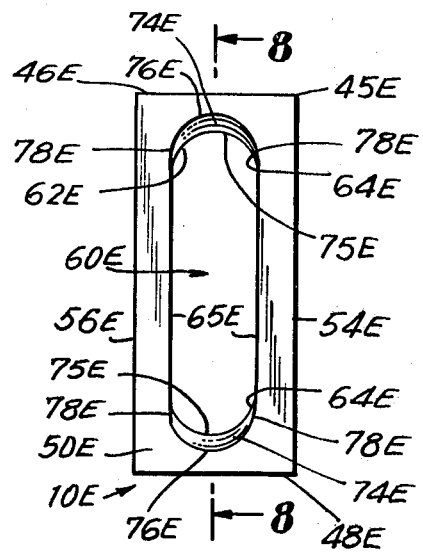
FIG. 7 is a front view of another embodiment of a washer of the present invention.
Figure 8:
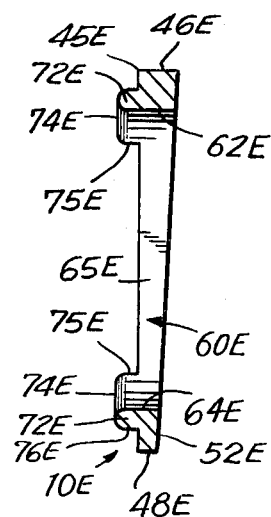
FIG. 8 is a sectional view taken on the line 8—8 of FIG. 7.

With reference to FIGS. 7 and 8, there is illustrated a fourth embodiment of the present invention depicting a washer 10E, and wherein similar parts are denoted by similar reference numerals. The washer 10E of this embodiment includes dual or a pair of locating means 70E for fixedly securing each end of the washer 10E relative to a first member. The washer 10E includes a body element 45E having oppositely disposed or spaced apart first or enlarged top and 46E and second or bottom end 48E. The bottom end 48E is of smaller rectangular dimension than the top end 46E to provide the wedge shaped configuration to the washer 10E. The body element 45E further includes a spaced apart front surface 50E and rear surface 52E inclined relative to each other in the direction of one of the respective ends 46E by a preselected angle of inclination selected to provide the necessary restraint to maintain the members in fixed position to each other. The body element 45E further includes a pair of side walls 54E and 56E that may extend in parallel spaced apart relationship to each other and in a plane normal to the ends 46E and 48E.

In similar fashion as described above an elongated slot 60E extends vertically in the body element 45E between the ends 46E and 48E and through the surfaces 50E and 52E. The slot 60E includes a pair of spaced apart terminal edges 62E and 64E adjacent the top end 46E and bottom end 48E respectively. A pair of longitudinal side edges 65E define the width of the slot 60E and extend in a plane substantially parallel to the respective side walls 54E and 56E, and join the terminal edges 62E and 64E together.

The washer 10E further includes a pair of locating means 70E for permitting removable positional securement of the body element 45E to the first member (not herein specifically shown). The locating means 70E includes a protrusion 72E positioned adjacent the upper end 46E and lower end 48E, and each having a forward tip or distal end 74E extending beyond the front surface 50E and adapted to be received in the aperture of the first member at each end thereof. Each protrusion 72E has an inner edge 75E that may coincide with the terminal edges 62E and 64E, respectively, and includes an outer edge 76E. The protrusion 72E has side faces 78E that define the outer margin of the protrusion 72E and may be of a width equal to that of slot 60E.

The present embodiment has specialized application in those instances where lateral or horizontal forces may be present, assuming the washer 10E is disposed in the vertical orientation depicted. Moreover, in those systems wherein the slot 60E is extensive; e.g. three inches or longer, there is a great tendency for pivotal movement of the washer. Thus, if only a singular protrusion 72E were provided at one end of the washer 10E, the same would be susceptible of pivotal movement of the other end. The ulitization of dual protrusions 72E obviates this tendency completely.

Figure 14:
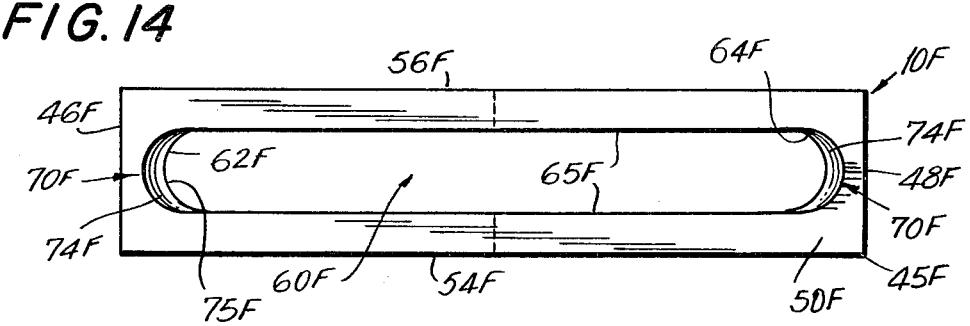
FIG. 14 is a top view of an alternate embodiment of a washer of the present invention.
Figure 15:
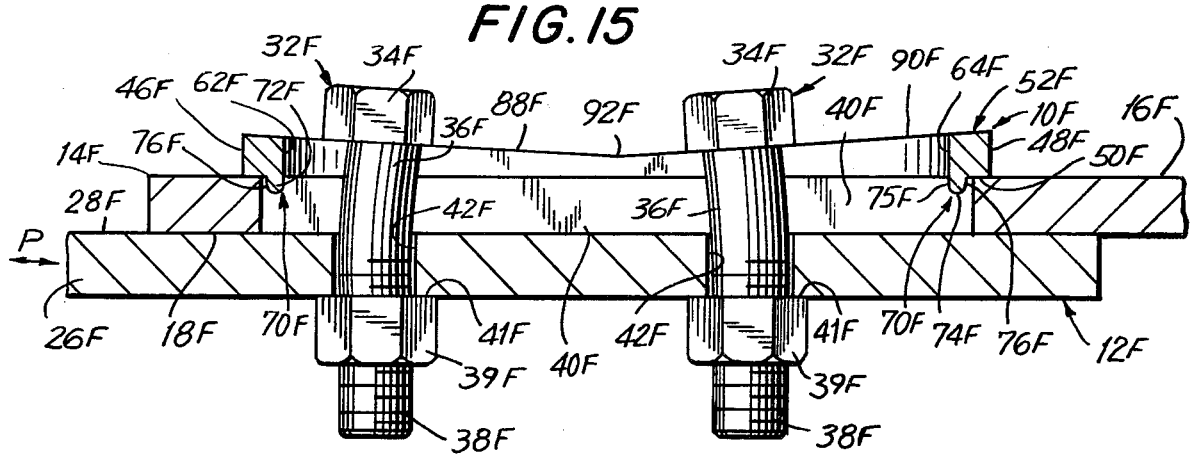
FIG. 15 is a sectional view, utilizing the washer of FIG. 14, and illustrating another fastening system in accordance with the present invention.

With reference to FIGS. 14 through 17, there are illustrated additional embodiments of the invention in which the washer is designed and constructed to withstand forces applied to the fastening system in more than one direction. Referring to FIGS. 14 and 15, there is depicted a dual fastening system 12F including a washer 10F, wherein similar parts are denoted by similar reference numerals. The washer 10F includes a body element 45F having oppositely disposed ends 46F and 48F.

The body element 45F further includes a spaced apart front surface 50F and rear surface 52F that are inclined relative to each other in the direction of both of the respective ends 46F and 48F. As illustrated in FIG. 15, the tapered surfaces 88F and 90F, which extend inwardly from the ends 46F and 48F, form the front surface 50F and extend outwardly from the center 92F thereof towards each said ends 46F and 48F by a preselected angle of inclination selected to provide the desired wedging affect to provide the necessary restraint to maintain the members 14F and 26F in fixed position relative to each other when the nuts 39F are tightened relative to each of the fasteners 32F. The body element 45F further includes a pair of side walls 54F and 56F that may extend in parallel spaced apart relationship to each other and in a plane normal to the ends 46F and 48F.

An elongated slot 60F extends longitudinally within the body element 45F between the ends 46F and 48F and through the surfaces 50F and 52F. A pair of locating means 70F is provided at each end of the slot 60F and includes a protrusion 72F positioned adjacent the ends 46F and 48F. Each protrusion 70F includes a forward tip 74F having an inner edge 75F which may coincide with the terminal edges 62F and 64F and includes an outer edge 76F.

The slot 60F is positioned in alignment with the aperture 40F, by means of the protrusions 72F, for receiving therethrough the shafts 36F of each fastener 32F with the enlarged bolt head 35F at the outer end thereof extending beyond the rear surface 52 for securing the members 14F and 26F and washer 10F together. The head 34F of one fastener 32F engages the inclined plane 88F while the other head 34F engages the inclined plane 90F. The slot 60F includes a pair of spaced apart terminal edges 62F and 64F adjacent to each end 46F and 48F, respectively. A pair of longitudinal side edges 65F define the width of the slot 60F and extend in a plane substantially parallel to the respective side walls 54F and 56F, and join the terminal edges 62F and 64F together.

In this manner the structural members 14F and 26F are held in place against lateral forces that may be applied thereto in either direction. This dual fastening system 12F prevents lateral movement of the washer 10F in view of the fact that two fasteners 32F are utilized, and each one is inclined in a different direction with respect to the inclined surfaces 88F and 90F. In this manner either protrusion 70F may abut the wall of the aperture 40F to limit the lateral movement of the members 14F and 26F.

Figure 16:
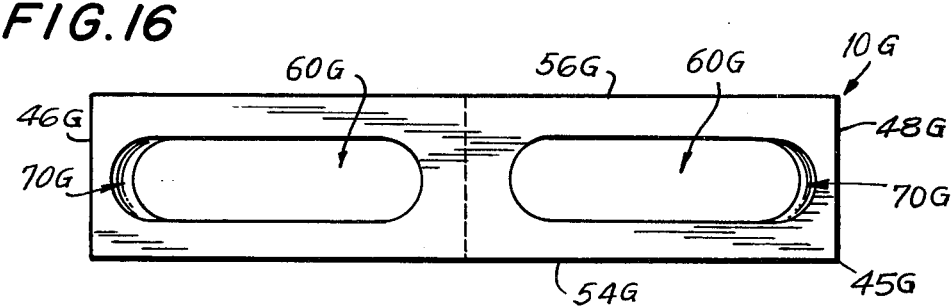
FIG. 16 is a top view of yet a further embodiment of a washer of the present invention.
Figure 17:
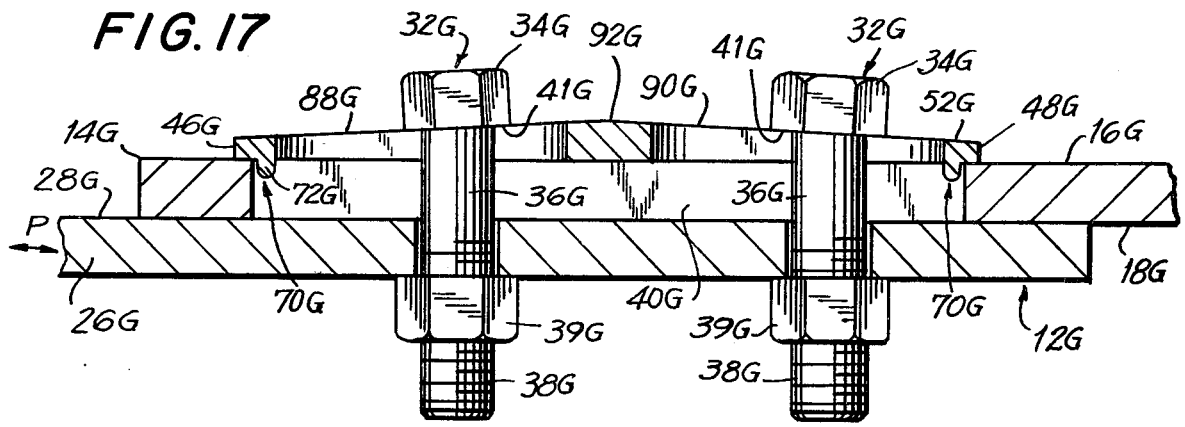
FIG. 17 is a sectional view utilizing the washer of FIG. 16, and illustrating another fastening system in accordance with the present invention.

FIGS. 16 and 17 illustrate an alternate embodiment to that illustrated in FIGS. 14 and 15, and wherein similar parts are denoted by similar reference numerals. As illustrated, the rear surface 52G is divided into two inclined sections or portions 88G and 90G that merge at junction 92G which may be central of the ends 46G and 48G. The tapered sections 88G and 90G are inclined upward from the ends 46G and 48G. As seen in FIG. 17, the shafts 36G may remain straight and the bolt heads 34G may bend to conform to the surfaces 88G and 90G.

The various embodiments illustrated herein are interchangeable in that the dual systems set forth in FIGS. 14 through 17 may be formed by washers having certain characteristics of those illustrated in FIGS. 1 through 8.

It is herein to be noted that the embodiment of the washer body elements depicted in FIGS. 6 and 7 are primarily intended for use with a specific size aperture formed in the heretofore discussed first members. However, they also provide adjustable utilization of the washer body elements when the aperture width is wider than that of the slot, and thus the width of the protrusion. With reference to the embodiments of the body elements shown in FIGS. 2 and 4, it will be apparent that the narrower width of the protrusion will enable these body elements to be utilized with slots of greatly varying widths.

Attention is also directed to the fact that although the present invention has been primarily discussed with reference to building systems, the apparatus and combination hereof have equal applicability in the fabrication of steel frames and generically whenever it is desired to wedgingly secure a first member to a second member and prevent relative movement thereof upon the application of external forces, in any mechanical system.

While I have shown and described the various embodiments of the present invention, and due to the detailed disclosure of said embodiments, it will be obvious and readily apparent to those skilled in the art that there are many modifications, changes and improvements which may be made in the present invention, as herein envisioned, without departing from the spirit and scope of the invention, as herein disclosed.

What is claimed is:

1. A washer for use in conjunction with a fastening system for rigidly locking a first member relative to a second member, one of said members having an aperture formed therein for receiving a fastener adapted to extend through said washer and having an enlarged outer end for engagement with said washer, said first and second members being provided with planar surfaces of engagement permitting adjustment relative to each other along a common plane and being normally subjected to external forces tending to shift said members relative to each other in one direction, said washer comprising a body element having oppositely disposed ends and spaced apart substantially planar surfaces intermediate said ends, said surfaces being inclined relative to each other, one of said surfaces being capable of engagement with one of said members in abutting relationship therewith and the other of said surfaces being inclined relative thereto, means cooperating with the aperture in said one of said members for permitting removable positional securement of said body element relative to the aperture in said one of said members, said body element having an elongated slot extending between said oppositely disposed ends and through said spaced apart surfaces, said slot being positionable in alignment with said aperture for receiving said fastener therethrough, the enlarged outer end of said fastener extending beyond said surfaces for securing said members and said washer together, said fastener having a longitudinal axis disposed in substantially parallel relationship to a plane which extends through and which is disposed at substantially right angles to said spaced apart substantially right angles to said spaced apart substantially planar surfaces, said elongated slots having a longitudinal axis disposed in substantially perpendicular relationship to the longitudinal axis of said fastener, and said inclined surfaces of said body element being disposed in wedging relationship between the engaged surface of said one of said members and said enlarged outer end of said fastener in dependence upon the application of said external forces for positively locking said members together.

2. A washer in accordance with claim 1, wherein said means for permitting removable positional securement with respect to said one of said members includes a protrusion disposed adjacent one of said ends, and said protrusion extending beyond said one of said surfaces and adapted to be received in the aperture at one end thereof.

3. A washer in accordance with claim 2, wherein said slot comprises a pair of spaced apart end edges adjacent each of said oppositely disposed ends, and a pair of longitudinal side edges joining said end edges.

4. A washer in accordance with claim 2, wherein said protrusion includes an inner edge and an outer edge and is formed adjacent one end of said slot, and said outer edge is adapted to engage the aperture in said member.

5. A washer in accordance with claim 4, wherein the width of said protrusion is narrower than the width of said slot.

6. A washer in accordance with claim 4, wherein the width of said protrusion is substantially equal to the width of said slot.

7. A washer in accordance with claim 4, wherein said inner edge of said protrusion coincides with said end edge of said slot.

8. A washer in accordance with claim 4, including another protrusion adajcent the opposite end of said body element.

9. A washer in accordance with claim 8, wherein each of the inner edges of each of said protrusions coincides with the respective one of said end edges of said slot.

10. A washer in accordance with claim 8, wherein one of said surfaces of said body element is divided into two inclined sections.

11. A washer in accordance with claim 10, wherein said inclined sections extend inwardly from said oppositely disposed ends.

12. A washer in accordance with claim 10, wherein said inclined sections extend upwardly from said oppositely disposed ends.

13. A washer in accordance with claim 2, wherein said surfaces of said body element are inclined relative to each other to form an enlarged end and a reduced end, said protrusion is formed adjacent said enlarged end of said body element having said one of said surfaces in abutting relationship with said one of said members, and the other of said oppositely disposed surfaces being inclined inwardly in the direction of said externally applied forces to said one of said members so as to permit the enlarged outer end of said fastener to conform to said angular inclination under the load of said externally applied forces.

14. A washer in accordance with claim 2, wherein said slot extends longitudinally between said oppositely disposed ends.

15. A washer for use in conjunction with a fastening system for rigidly locking a first member relative to a second member, said first member having an aperture formed therein for receiving a fastener adapted to extend through said washer and having an enlarged outer end for engagement with said washer, said first and second members being provided with planar surfaces of engagement permitting adjustment relative to each other along a common plane and being normally subjected to external forces tending to shift said members relative to each other in one direction.

said washer comprising a body element having oppositely disposed ends and spaced apart substantially planar front and rear surfaces intermediate said ends, said rear surface being inclined relative to said front surface, said front surface being capable of engaging said first member in abutting relationship therewith, and said outer rear surface being inclined relative thereto for wedging engagement with the enlarged outer end of said fastener, means cooperating with the aperture in said first member for permitting removable positional securement of said body element relative to the aperture in said first member and including a protrusion adjacent one of said ends extending beyond said front surface and which is adapted to be received in the aperture at one of the ends thereof, an elongated slot extending longitudinally in said body element between said oppositely disposed ends and through said front and rear surfaces, said slot being positionable in alignment with said aperture for receiving therethrough the fastener with the enlarged outer end of said fastener extending beyond said rear surface for securing said members and said washer together, said fastener having a longitudinal axis disposed in substantially parallel relationship to a plane which extends through and which is disposed at substantially right angles to said spaced apart front and rear surfaces, the longitudinal axis of said elongated slot being disposed in substantially perpendicular relationship to the longitudinal axis of said fastener, said slot comprising a pair of spaced apart end edges adjacent each of said oppositely disposed ends, and a pair of longitudinal side edges joining said end edges.

16. A washer in accordance with claim 15, wherein the width of said protrusion is narrower than the width of said slot.

17. A washer in accordance with claim 15, wherein the width of said protrusion is substantially equal to the width of said slot.

18. A washer in accordance with claim 15, wherein said inner edge of said protrusion coincides with one of said end edges of said slot.

19. A washer in accordance with claim 15, including another protrusion adjacent the opposite one of said ends of said body element.

20. A washer in accordance with claim 19, wherein each of said inner edges of each of said protrusions coincides with a respective one of said end edges of said slot.

21. A washer in accordance with claim 20, wherein said rear surface is divided into two inclined sections.

22. A washer in accordance with claim 21, wherein said inclined sections extend inwardly from said oppositely disposed ends.

23. A washer in accordance with claim 21, wherein said inclined sections extend upwardly from said oppositely disposed ends.

24. A washer in accordance with claim 15, wherein said front and rear surfaces are inclined relative to each other to form an enlarged end and a reduced end, said protrusion is formed adjacent said enlarged end of said body element, said body element having said front surface thereof disposed in abutting relationship with said first member, and said rear surface of said body element being inclined inwardly in the direction of said externally applied forces to said members so as to permit the enlarged outer end of said fastener to conform to said angular inclination under the load of said externally applied forces.

25. A washer for use in conjunction with a fastening system for rigidly locking a first member relative to a second member, said first member having an aperture formed therein for receiving a pair of fasteners adapted to extend through said washer, each of said fasteners having an enlarged outer end for engagement with said washer, said first and second members being provided with planar surfaces of engagement permitting adjustment relative to each other along a common plane and being normally subjected to external forces tending to shift said members relative to each other in different directions, said washer comprising a body element having oppositely disposed ends and spaced apart front and rear surfaces intermediate said ends, said rear surface having a pair of substantially planar inclined sections relative to each of said oppositely disposed ends, said front surface being substantially planar and capable of engaging said first member in abutting relationship therewith and said rear surface being inclined relative thereto, means cooperating with the aperture in said first member for permitting removable positional securement of said body element relative to the aperture in said first member, an elongated slot extending longitudinally within said body element between said oppositely disposed ends and through said front and rear surfaces, said slot being positionable in alignment with said aperture for receiving therethrough said fasteners with the enlarged outer ends of said fasteners engaging said rear surface for securement of said first and second members and said washer with respect to one another, said elongated slot having a longitudinal axis disposed in substantially perpendicular relationship to each axis of each of said fasteners, and said inclined sections of said rear surface of said body element being disposed in wedging engagement between the first member and the enlarged outer end of each of said fasteners as the external forces are applied to either member, thereby positively locking said members together.

26. A washer in accordance with claim 25, wherein said means for permitting removable positional securement with respect to said first member includes a protrusion adjacent each of the ends of said slot, and said protrusions extending beyond said front surface and being adapted to be received in the aperture at approximately each of the respective ends thereof.

27. A washer in accordance with claim 25, wherein said slot includes
   a pair of spaced apart end edges adjacent each of said oppositely disposed ends, and
   a pair of longitudinal side edges joining said end edges.

28. A washer in accordance with claim 26, wherein each of said protrusions are formed adjacent respective ones of said ends of said slot,
   said slot having an inner edge and an outer edge,
   each of said inner edges coinciding with respective ones of said end edges, and
   said outer edges being adapted to engage the aperture in said member.

29. A washer in accordance with claim 28, wherein said protrusions at the outer extremity thereof are narrower than the width of said slot.

30. A washer in accordance with claim 28, wherein said protrusions at the outer extremity thereof are substantially equal to the width of said slot.

31. A washer in accordance with claim 25, wherein said inclined sectons extend inwardly from said ends.

32. A washer in accordance with claim 31, wherein said inclined sections are of substantially equal length and extend at substantially the same angle of inclination.

33. A washer in accordance with claim 25, wherein said inclined sections extend upwardly from said oppositely disposed ends.

34. A washer in accordance with claim 33, wherein said inclined sections are of substantially equal length and extend at substantially the same angle of inclination.

35. A fastening system for use in bolting together a first member and a second member, said second member having an aperture extending therethrough, said first and second members. having planar surfaces of engagement capable of shifting relative to each other when subjected to external forces said fastening system comprising
   a fastener having an enlarged outer end and extending through said aperture,
   a washer comprising a body element having oppositely disposed ends and substantially planar spaced apart front and rear surfaces intermediate said ends, said surfaces being inclined relative to each other, said front surface being adapted to engage said second member in abutting relationship therewith and said rear surface being inclined relative thereto,
   means cooperating with the aperture in said second member for permitting removable positional securement of said body element relative to the aperture in said first member including a protrusion adjacent one of said ends extending beyond said front surface and which is adapted to be received in the aperture at said one of said ends thereof,
   an elongated slot extending in said body element between said oppositely disposed ends and through said front and rear surfaces, said slot being positionable in alignment with the aperture for receiving therethrough said fastener with said enlarged outer end of said fastener extending beyond said rear surface for securing said members and said washer together,
   said elongated slot having a longitudinal axis disposed in substantially perpendicular relationship to the axis of said fastener, and
   said inclined surfaces of said body element being disposed in wedging relationship between said first member and said enlarged outer end of said fastener as the external forces are applied, thereby positively locking said members together.

36. A fastening system in accordance with claim 35, wherein
   said fastener is in the form of a bolt having a shaft with a head at one end and a nut on the other end, and said first and second members being disposed between said ends of said bolt.

37. A fastening system in accordance with claim 36, wherein
   said elongated outer end comprises said bolt head.

38. A fastening system in accordance with claim 37, wherein
   said bolt head is capable of angular bending to conform to said inclined rear surface upon the application of said external forces.

39. A fastening system in accordance with claim 36, wherein
   said enlarged outer end comprises said nut.

40. A fastening system in accordance with claim 39, wherein
   said bolt shaft is capable of bending movement to permit said nut to conform to said inclined rear surface.

41. A fastening system in accordance with claim 35, wherein said slot comprises
   a pair of spaced apart end edges adjacent each of said oppositely disposed ends, and
   a pair of longitudinal side edges joining said end edges.

42. A fastening system in accordance with claim 35, wherein
   said protrusion is formed adjacent one end of said slot and has an inner edge and an outer edge, and
   said outer edge is adapted to engage the aperture in said first member.

43. A fastening system in accordance with claim 42, wherein
   said protrusion at the outer extremity thereof is narrower than the width of said slot.

44. A fastening system in accordance with claim 42, wherein
   said protrusion at the outer extremity thereof is substantially equal to the width of said slot.

45. A fastening system in accordance with claim 42, including another protrusion adjacent the opposite end of said body element.

46. A fastening system in accordance with claim 45, wherein
   each of said inner edges of each of said protrusions coincides with a respective one of said end edges of said slot.

47. A fastening system in accordance with claim 45, wherein
   said rear surface is divided into two inclined sections.

48. A fastening system in accordance with claim 47, wherein
   said inclined sections extend inwardly from said ends.

49. A fastening system in accordance with claim 47, wherein
said inclined sections extend upwardly from said ends.

50. A fastening system in accordance with claim 45, wherein
said surfaces are inclined relative to each other to form an enlarged end and a reduced end,
said protrusion is formed adjacent said enlarged end of said body element which has one of said rear surfaces adapted to engage said first member, and
said front surface is inclined inwardly in the direction of the external forces applied to said members so as to permit said enlarged outer end of said fastener to conform under the load of the applied forces to the inwardly inclined angle of said front surface.

51. A washer for use in conjunction with fastening devices, comprising
a body element having oppositely disposed ends and spaced apart substantially planar front and rear surfaces intermediate said ends,
said surfaces being inclined relative to each other, and
an elongated slot extending between said oppositely disposed ends and through said spaced apart surfaces,
said elongated slot having a longitudinal axis,
said longitudinal axis being disposed in substantially perpendicular relationship to a plane extending through said front and rear surfaces and which plane is disposed at substantially right angles to said front and rear surfaces,
a protrusion disposed immediately adjacent one of said ends, and
said protrusion extending beyond one of said surfaces and being adapted to cooperate with an aperture in a member to be fastened, whereby said protrusion permits removable positional securement of said body element relative to the aperture.

52. A washer in accordance with claim 51, wherein said slot comprises
a pair of spaced apart end edges adjacent each of said oppositely disposed ends, and
a pair of longitudinal side edges joining said end edges.

53. A washer in accordance with claim 51, wherein said protrusion includes an inner edge and an outer edge and is formed adjacent one end of said slot.

54. A washer in accordance with claim 53, wherein the width of said protrusion is narrower than the width of said slot.

55. A washer in accordance with claim 53, wherein the width of said protrusion is substantially equal to the width of said slot.

56. A washer in accordance with claim 53, wherein said inner edge of said protrusion coincides with said end edge of said slot.

57. A washer in accordance with claim 54, including another protrusion adjacent the opposite end of said body element.

58. A washer in accordance with claim 57, wherein each of inner edges of each of said protrusions coincides with the respective one of said end edges of said slot.

59. A washer in accordance with claim 57, wherein one of said surfaces of said body element is divided into two inclined sections.

60. A washer in accordance with claim 59, wherein said inclined sections extend inwardly from said oppositely disposed ends.

61. A washer in accordance with claim 59, wherein said inclined sections extend upwardly from said oppositely disposed ends.

62. A washer in accordance with claim 51, wherein said surfaces of said body element are inclined relative to each other to form adjacent said enlarged end of said body element,
the other of said oppositely disposed surfaces being inclined inwardly in the direction of said one of said surfaces.

63. A washer in accordance with claim 51, wherein said slot extends longitudinally between said oppositely disposed ends.

64. A washer in accordance with claim 25, wherein
said first member has a pair of apertures formed therein for receiving said pair of fasteners, and
said elongated slot being positionable in alignment with said pair of apertures, and each of said apertures being capable of receiving therethrough one of said pair of fasteners with the enlarged outers ends of respective ones of said pair of fasteners engaging respective ones of said inclined sections of said rear surfaces for securement of said first and second members and said washer with respect to one another.

65. A washer in accordance with claim 64, wherein
said means for permitting removable positional securement with respect to said first member includes a protrusion adjacent each of the ends of said slot, and said protrusions extending beyond said front surface and being adapted to be received in the aperture at approximately each of the respective ends thereof.

66. A washer in accordance with claim 65, wherein said slot includes
a pair of spaced apart end edges adjacent each of said oppositely disposed ends, and
a pair of longitudinal side edges joining said end edges.

67. A washer in accordance with claim 66, wherein
each of said protrusions are formed adjacent respective ones of said ends of said slot,
said slot having an inner edge and an outer edge,
each of said inner edges coinciding with respective ones of said end edges, and
said outer edges being adapted to engage the aperture in said member.

68. A washer in accordance with claim 68, wherein
said protrusions at the outer extremity thereof are substantially equal to the width of said slot, and
said inclined sections extend inwardly from said ends.

69. A washer in accordance with claim 68, wherein
said inclined sections are of substantially equal length and extend at substantially the same angle of inclination.

70. A washer in accordance with claim 25, wherein
each of said inclined sections of said rear surface having an elongated slot extending longitudinally within and extending through said front and rear surfaces,
said first member having first and second apertures therein for receiving one of said pair of fasteners,
each of said elongated slots being positionable in alignment with one of said apertures for receiving therethrough one of said fasteners with the enlarged outer ends of each of said fasteners engaging respective ones of said inclined sections of said rear surface for securement of said first and second members and said washer with respect to one another, and each of said elongated slots having a longitudinal axis disposed in substantially perpendicular relationship to the axis of the respective fastener extending therethrough.

71. A washer in accordance with claim 70, wherein said means for permitting removable positional securement with respect to said first member includes a protrusion adjacent each of the ends of said slots, and said protrusions extending beyond said front surfaces and being adapted to be received in the aperture at approximately each of the respective ends thereof.

72. A washer in accordance with claim 70, wherein said inclined sections extend upwardly from said oppositely disposed ends.

73. A washer in accordance with claim 72, wherein said inclined sections are of substantially equal length and extend at substantially the same angle of inclination.

* * * * *

UNITED STATES PATENT OFFICE
CERTIFICATE OF CORRECTION

Patent No. 4,073,329     Dated February 14, 1978

Inventor(s) Alfred A. Hala

It is certified that error appears in the above-identified patent and that said Letters Patent are hereby corrected as shown below:

| | |
|---|---|
| Claim 31, line 2 (Column 13) | Change "sectons" to --sections--. |
| Claim 35, line 6 | Insert a comma --,-- after the word "forces". |
| Claim 58, line 2 (Column 15) | After "each of", insert --the--. |
| Claim 62, line 3 (Column 16) | Change "to form adjacent said enlarged end of said body element," to --to form an enlarged end and a reduced end, said protrusion is formed adjacent said enlarged end of said body element, --. |
| Claim 64, line 7 | Change "outers" to --outer--; |
| line 10 | Change "surfaces" to --surface--. |

Signed and Sealed this

Sixth Day of June 1978

[SEAL]

Attest:

RUTH C. MASON
*Attesting Officer*

DONALD W. BANNER
*Commissioner of Patents and Trademarks*